(12) United States Patent
Beesley et al.

(10) Patent No.: US 6,909,965 B1
(45) Date of Patent: Jun. 21, 2005

(54) SYSTEM AND METHOD FOR CREATING AND ORGANIZING NODE RECORDS FOR A CARTOGRAPHIC DATA MAP

(75) Inventors: Darin J. Beesley, Overland Park, KS (US); Michael Childs, Olathe, KS (US)

(73) Assignee: Garmin Ltd. (KY)

( * ) Notice: Subject to any disclaimer, the term of this patent is extended or adjusted under 35 U.S.C. 154(b) by 70 days.

(21) Appl. No.: 10/036,216

(22) Filed: Dec. 28, 2001

(51) Int. Cl.[7] ...................... G01C 21/32; G01C 21/00; G06F 17/30
(52) U.S. Cl. .................. 701/209; 701/206; 340/990
(58) Field of Search ............................ 701/209, 206, 701/208, 207, 210, 200, 212; 340/990, 988, 995, 980

(56) References Cited

U.S. PATENT DOCUMENTS

| | | | | |
|---|---|---|---|---|
| 4,937,753 A | * | 6/1990 | Yamada | 364/449 |
| 4,943,925 A | * | 7/1990 | Moroto et al. | 364/449 |
| 5,285,391 A | * | 2/1994 | Smith, Jr. et al. | 364/443 |
| 5,371,678 A | * | 12/1994 | Nomura | 364/444 |
| 5,410,485 A | | 4/1995 | Ichikawa | 364/444 |
| 5,546,107 A | | 8/1996 | Deretsky et al. | 396/600 |
| 5,614,895 A | * | 3/1997 | Ohomori et al. | 340/995 |
| 6,112,200 A | | 8/2000 | Livshutz et al. | 707/4 |
| 6,169,956 B1 | | 1/2001 | Morimoto et al. | 701/209 |
| 6,256,579 B1 | | 7/2001 | Tanimoto | 701/201 |
| 6,263,277 B1 | | 7/2001 | Tanimoto et al. | 701/209 |
| 6,269,303 B1 | | 7/2001 | Watanabe et al. | 701/209 |
| 6,308,177 B1 | * | 10/2001 | Israni et al. | 707/100 |
| 6,421,659 B1 | * | 7/2002 | Nomura | 707/3 |
| 6,609,063 B1 | * | 8/2003 | Bender et al. | 701/209 |

* cited by examiner

Primary Examiner—William Cuchlinski
Assistant Examiner—Dalena Tran
(74) Attorney, Agent, or Firm—Devon A. Rolf

(57) ABSTRACT

A method for organizing roadway network data in a memory storage device is provided. A data set indicative of a roadway network is provided. Proximity criteria for intersection nodes between the roads in the roadway network is identified. The intersection nodes are grouped into a node block based on the proximity criteria. Node records which contain data indicative of the nodes are stored as a group in the node block in contiguous memory.

37 Claims, 6 Drawing Sheets

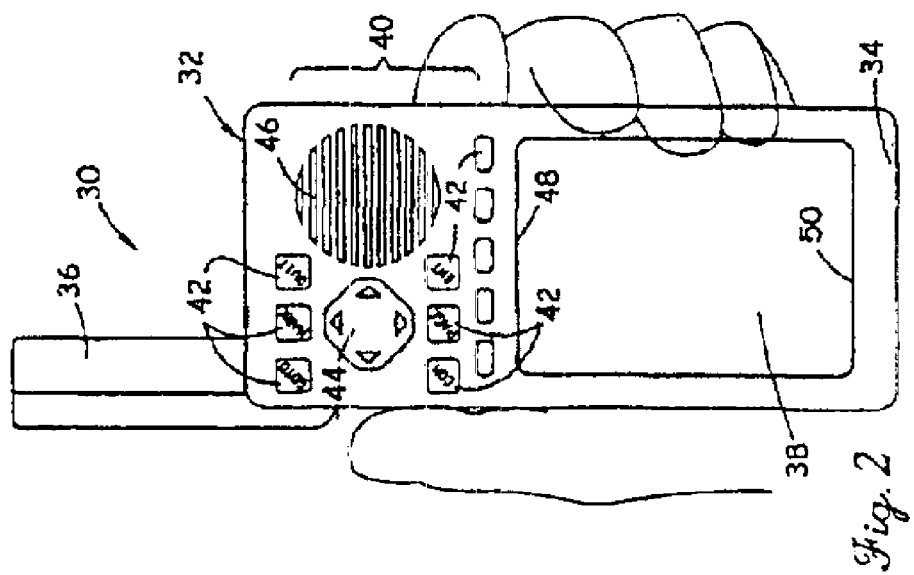
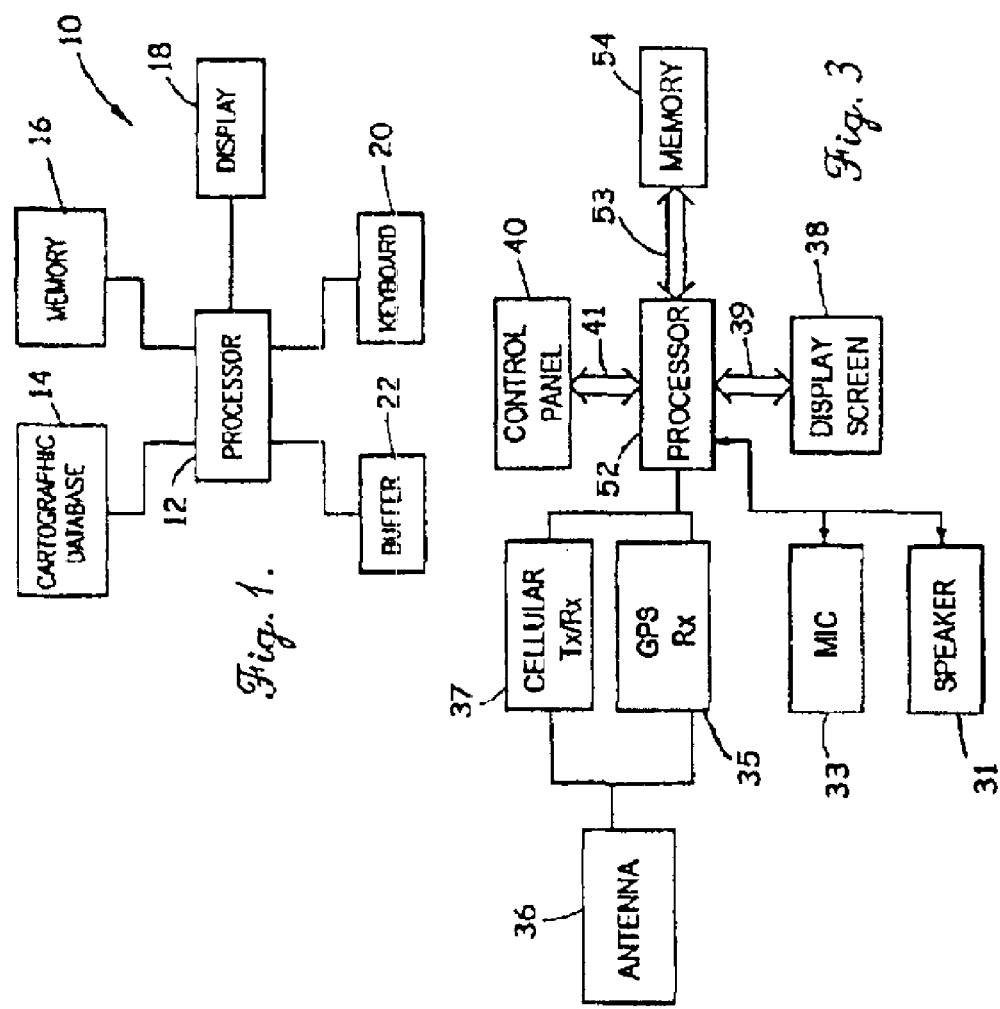

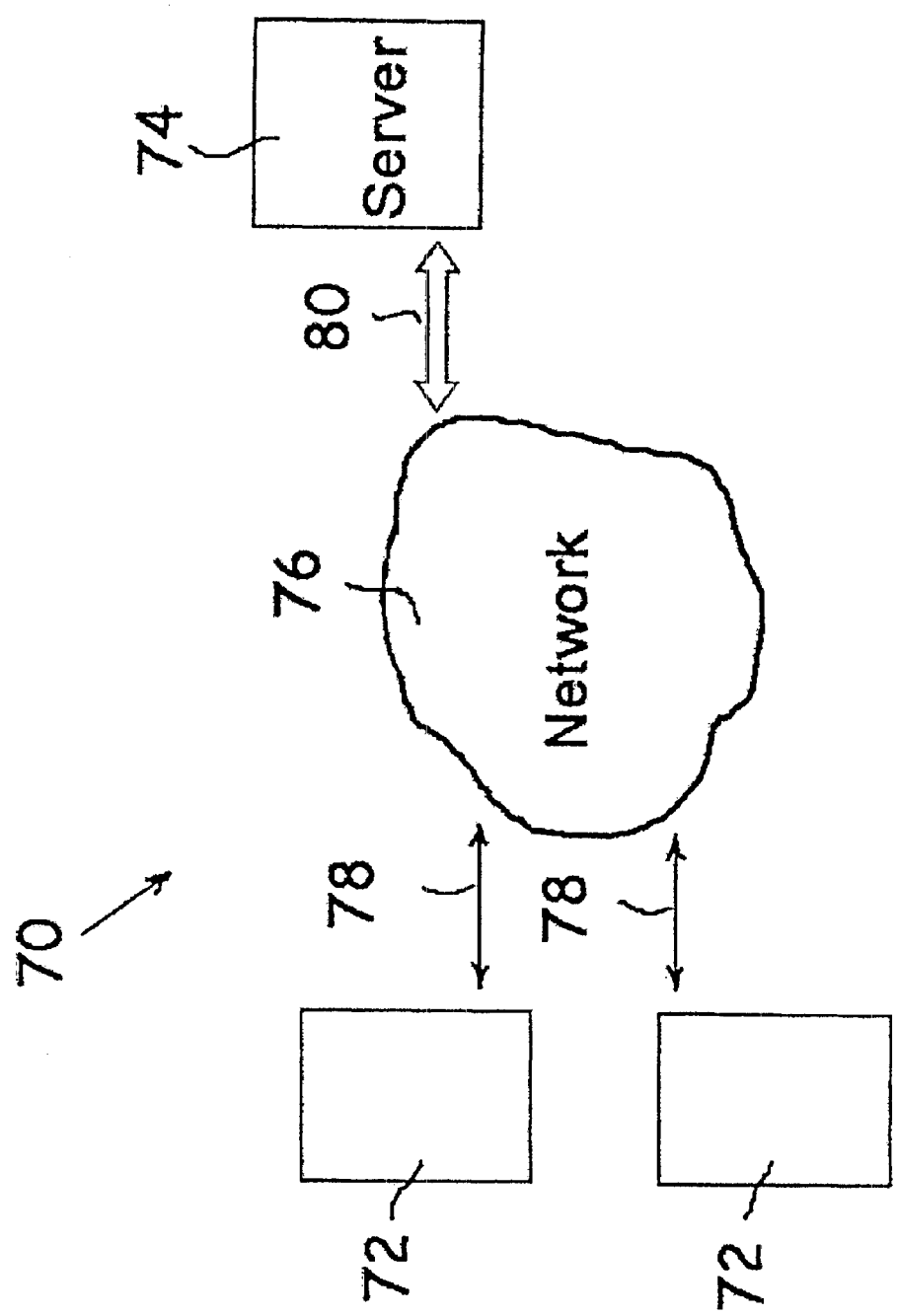

Fig. 7

| | |
|---|---|
| Node block 1 | ~130 |
| Node block 2 | ~132 |
| Node block 3 | ~134 |
| . | |
| . | ~136 |
| . | |
| Node block N-1 | |
| Node block N | ~138 |

| | |
|---|---|
| Node record 1 | ~152 |
| Node record 2 | ~154 |
| Node record 3 | ~156 |
| . | |
| . | ~158 |
| . | |
| Node record K-1 | |
| Node record K | ~160 |
| Node block record | ~162 |

152

| Field | Field | Field | List of Sub-Records |
|---|---|---|---|
| 170 | 172 | 174 | 176 |

176

| Field | Field | Field | Field | Field | Field |
|---|---|---|---|---|---|
| 178 | 180 | 182 | 184 | 186 | 188 |

162

| Field | Field | Field | Field |
|---|---|---|---|
| 192 | 194 | 196 | 198 |

SYSTEM AND METHOD FOR CREATING AND ORGANIZING NODE RECORDS FOR A CARTOGRAPHIC DATA MAP

BACKGROUND OF THE INVENTION

Certain embodiments of the present invention generally relate to systems and methods for creating, storing and accessing roadway network data in a database. Certain embodiments of the present invention generally relate to navigation systems and methods that utilize proximity information to organize blocks of node records.

Route planning systems are well known in the field of navigational instruments. Route planning systems in general define one or more paths through a network of roads between source and destination locations. The path(s) planned by the system may be based on one or more criteria, such as shortest distance, shortest time, user preferences and the like. Several algorithms are known for performing route planning, with such algorithms calculating the route from the source or destination location or from both simultaneously. Conventional planning algorithms operate based on a predefined stored data structure, which includes data indicative of a geographic region containing the source and destination locations.

Presently, cartographic information is charted or mapped by data suppliers as large cartographic data maps. A single cartographic data map may include detailed information for multiple adjoining metropolitan areas and/or detailed maps for large geographic areas and the like. A cartographic data map is typically divided by the data suppliers, by manufactures of the routing devices or by service providers into smaller data structures having a size more conducive to storage on, or wireless transmission to, a navigation or route planning device.

In general, each data structure or data set corresponds to a particular geographic region, such as a city, a county, a state, a country, a continent, etc. Each data structure or data set contains data indicative of features within the associated geographic region. The feature information stored within each data structure may include geographic coordinates (altitude, longitude and latitude), more detailed feature information (county roads, city streets, restaurants, and the like), and higher level feature information (e.g. interstates, state highways, and the like) that collectively define a roadway network. The data structure includes nodal data for each intersection of roads in the roadway network.

Conventional methods for route planning depend on the capabilities of system resources, such as processor speed and the amount and speed of memory. Additionally, many route planning systems require database storage of spatial data. Due to cost considerations, many of these products have tight restrictions on processor performance and on available on-board memory for mass database storage. Hardware restrictions of this nature are particularly troublesome for portable products, such as global positioning devices, involving embedded systems, because such systems require access to spatial (e.g., geographic/cartographic) data for mapping or navigation purposes. The volume of such data is quite large, and the available memory is limited by cost, physical size, and weight considerations. Methods for storing spatial data more efficiently would be useful to either minimize the amount of memory needed, increase the amount of data that may be stored on current systems, or decrease the amount of time necessary to calculate a route.

Conventional route planning systems have experienced certain limitations in organizing and internally transferring data. Generally, route planning systems include at least two memory areas, namely long-term or slow memory that stores large amounts of data for long periods of time and work-space or fast memory that temporarily stores one block of data only while a processor accesses the data. The work-space memory is erased and reloaded each time the processor needs data from the long-term memory that is not in the presently loaded block in the work-space.

Data is loaded into the work-space memory in blocks of predefined size from the long-term memory. The long-term memory is also referred to hereafter as a first memory storage device, and may include a hard drive, CD, disk, and the like. The work-space memory is also referred to hereafter as a second memory, and may include "cache" memory, a direct memory access area, and the like. During operation, the route planner identifies data in the long-term memory, such as nodal data, to which access is desired. In order to access nodal data the route planner must load a data segment of contiguous memory containing the desired nodal data. The data segment is loaded into the work-space memory before reading the content of particular nodal data. The loaded segments are of fixed length based on the size of the work-space memory. The loaded segment is larger than the desired nodal data and thus additional or peripheral nodal data are loaded in the work-space memory with the desired nodal data.

In many system architectures, the cache memory may generally only store one data segment at a time. Hence, only one data segment is accessible to the processor at a time. As the search algorithm advances through potential paths, various nodal data is analyzed. To analyze nodal data, it must be loaded into the cache memory. In each iteration through the search algorithm one or more nodes of interest are identified. If the next nodes of interest are in the presently loaded data segment, the processor simply needs to access the cache memory. However, if the next nodes of interest are not in the loaded data segment, the cache must be "flushed" (erased) and a new data segment loaded from the long-term memory into the cache memory. Data transfers consume time and power. Therefore, it is desirable to flush and reload the cache as few times as possible.

One method proposed for storing spatial data in the long-term memory utilizes an R-Tree index structure. Conventional R-Trees are characterized by a number of bounding rectangles, with a root bounding rectangle representing at least the boundary of the entire spatial region packed and indexed by the R-Tree. Bounding rectangles describe the minimum and maximum latitude and longitude extents of geographical areas. The R-Tree is build based upon a familial relationship, such as parent-child, between bounding rectangles. The bounding rectangles "spread out" below the root, which is the parent of the R-Tree. Each bounding rectangle depending from the root is a child of the root, and may also be a parent to one or more child bounding rectangles. Each child includes information more detailed than the parent, and may also include information that is included in the parent. Thus, bounding rectangles may overlap and identical cartographic data may be stored in multiple locations.

Fractal geometry and space filling curves, such as the Hilbert Space-Filling Curve, have been used to achieve better ordering or an improved clustering of the bounding rectangles to be packed in an R-Tree. The Hilbert Space-Filling Curve accesses two dimensional data and formats it to be stored in a one dimensional space. The Hilbert Space-Filling Curve visits all coordinates in a grid (e.g., rectangle) exactly once, and never crosses itself. Unfortunately, the use of space filling curves, used in connection with the R-Tree format, does not reduce the amount of data to be stored or the need to access multiple bounding rectangles for proximal data.

Conventional navigation devices do not efficiently store data in a manner to minimize the amount of memory required or the time necessary to repeatedly access data from a storage location (e.g., dereferencing a node). Because conventional navigation and route planning devices do not store data in an efficient manner, the devices require additional resources such as memory, and the user must wait a longer period of time for the route to be planned.

Thus, a need exists for improved navigation and route planning devices capable of storing data efficiently, using less storage space and calculating a route faster.

BRIEF SUMMARY OF THE INVENTION

In accordance with at least one embodiment, a method for organizing roadway network data in a memory storage device is provided. A data set indicative of a roadway network is provided. Proximity criteria for intersection nodes between roads in the roadway network is identified. The nodes are grouped into a node block based on the proximity criteria. Node records which contain data indicative of the nodes are stored as a group in the node block in contiguous memory.

In accordance with at least one embodiment, a method for calculating a navigation route between two geographic locations is provided. A data set comprised of node blocks of data is provided. The data is indicative of a roadway network of roads which intersect at intersection nodes and includes proximity criteria indicative of the intersection nodes. A first node record, which is included in a first node block and includes data indicative of a first geographic location, is accessed. A bearing direction from the first location towards a second location is calculated based on the proximity criteria included in the first node block. A header or footer is accessed. The header or footer includes common feature data indicative of traffic characteristics for the referenced roads and is included in the first node block. A second node record is accessed. The second node record includes data indicative of a navigation route contiguous from the first node record.

In accordance with at least one embodiment, a data structure for defining a roadway network having road segments intersecting at nodes is provided. The data structure is embodied on a computer readable medium. The data structure comprises node records containing data indicative of corresponding nodes in a roadway network. A first node record corresponds to a first node and contains adjacency information indicative of an estimated location of adjacent nodes directly connected to the first node. The estimated location is determined with respect to the first node.

In accordance with at least one embodiment, a navigation system is provided. A first memory storing data sets indicative of roadway networks is provided. The data sets are stored in blocks of data including geographical data indicative of nodes that are proximately located. A second memory is provided for storing at least one of the blocks of data temporarily. A route calculation module is provided for calculating a planned route over the roadway network between a source and a destination location based on data stored in the second memory. A display is utilized to display the route calculated by the route calculation module.

BRIEF DESCRIPTION OF THE DRAWINGS

FIG. 1 illustrates a block diagram of a navigation device formed in accordance with an embodiment of the present invention.

FIG. 2 illustrates a front view of a navigation device formed in accordance with an embodiment of the present invention.

FIG. 3 illustrates a block diagram of a navigation device formed in accordance with an embodiment of the present invention.

FIG. 4 illustrates a navigation system formed in accordance with an embodiment of the present invention.

FIG. 7 illustrates a memory map of node blocks formed and stored in accordance with an embodiment of the present invention.

FIG. 8 illustrates a memory map of a node block formed and stored in accordance with an embodiment of the present invention.

Figure 5:
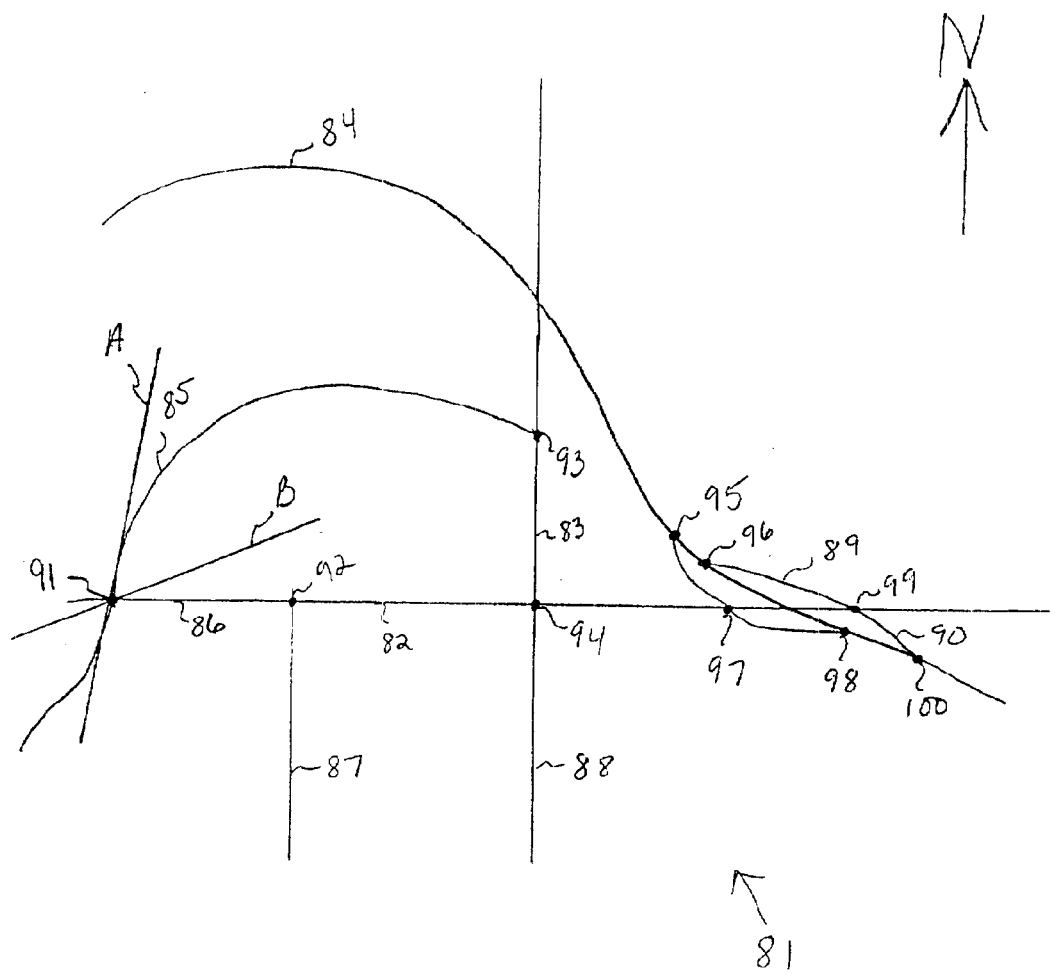
FIG. 5 illustrates an exemplary roadway network utilized in accordance with an embodiment of the present invention.

The foregoing summary, as well as the following detailed description of the embodiments of the present invention, will be better understood when read in conjunction with the appended drawings. It should be understood, however, that the present invention is not limited to the arrangements and instrumentality shown in the attached drawings.

DETAILED DESCRIPTION OF THE INVENTION

FIG. 1 illustrates a system 10 formed in accordance with an embodiment of the present invention. The system 10 includes at least one processor 12 for carrying out various processing operations discussed below in more detail. The processor 12 is connected to a cartographic database 14, memory 16, a display 18, a keyboard 20, and a buffer 22. Optionally, more than one processor 12 may be included. The cartographic database 14 may store data indicative of a roadway network (in full or in part) used in connection with embodiments of the present invention. The memory 16, while illustrated as a single block, may comprise multiple discrete memory locations and/or discs for storing various types of routines and data utilized and/or generated by embodiments of the present invention. The buffer 22 represents a memory storage area that may be within memory 16 or separate therefrom. Buffer 22 is used to temporarily store data and/or routines used in connection with embodiments of the present invention. The display 18 displays information to the user in an audio and/or video format. The keyboard 20 permits the user to input information, instructions and the like to the processor 12 during operation.

By way of example only, initial operations may be carried out by an operator of the system 10, utilizing the keyboard 20 for controlling the processor 12 in the selection of parameters, defining data structures to be developed and/or accessed, and the like.

The data structure(s) stored in the cartographic database 14, memory 16, and/or buffer 22 may include data indicative of features associated with a roadway network and/or a geographic area. The data may represent points, lines, areas, coordinates (longitude, latitude and altitude), or otherwise. For instance, portions of a highway, river or boundary (e.g., a state or country boundary), trails and the like may be represented by linear features stored in the data structure. In addition, cities, towns, neighborhoods, communities and the like may be represented by point features within the data structure. Also, buildings, lakes, and the like may be represented by area features. Prior to storage, various common features may be identified for cartographic data and such common features may be classified based upon predefined hierarchies. For example, interstate highways may be defined and/or organized as one feature class, state highways and roads may be defined as a second feature class, and county roads may be defined as a third feature class. Features other than roads, such as rivers and waterways, may also be classified. As a further example, geographic boundaries (e.g., state and county lines) may be assigned one or more different feature classes.

FIG. 2 illustrates a portable electronic device 30 formed in accordance with an embodiment of the present invention. The electronic device 30 is oriented along a vertical axis (as illustrated) or horizontal axis when held by a user. The portable electronic device 30 includes a housing 32 having a face plate 34 and sidewalls and a back wall (not shown). The portable electronic device 30 further includes an antenna 36 mounted at one corner of the housing 32. The face plate 34 is substantially rectangular in shape. The face plate 34 securely frames the display screen 38 and houses the control panel 40. The control panel 40 includes several push button-type keys 42 that afford the user control over the portable electronic device 30.

Optionally, a directional toggle pad 44 may be included within the control panel 40. In one application, such as when utilizing the portable electronic device 30 within a global positioning system, the toggle pad 44 affords the ability to scan through a large map of a geographic area, all or a portion of which is stored in memory of the portable electronic device 30. The portable electronic device 30 then displays portions of the scanned map on the display screen 38. The display screen 38 also illustrates planned routes through geographic areas between source and destination locations. Optionally, the control panel 40 may include a speaker/microphone combination, designated by reference numeral 46, to afford communication between the operator and a remote destination.

The display screen 38 may be located below the control panel 40 (when oriented along a vertical axis) to afford easy data entry by the user. When vertically oriented, the display screen 38 is controlled to orient data upon the display screen 38 such that side 48 of the display screen 38 represents the top of the data to be displayed, while side 50 of the display screen 38 represents the bottom. Thus, the data is preferably displayed from the top 48 to the bottom 50 of the display screen 38.

FIG. 3 illustrates a block diagram for an electronic circuit of the portable electronic device 30 formed in accordance with an embodiment of the present invention. The electronic circuit includes a processor 52 that communicates via the control panel 40 through line 41. The processor 52 communicates via line 39 with the display screen 38. The electronic circuit further includes a memory 54 that is accessed by the processor 52 via line 53. The antenna 36 is connected to the processor 52 via a cellular transmitter/receiver 37 and a GPS receiver 35. The electronic circuitry of the portable electronic device 30 is powered by a power supply (not shown) housed within the device or connected thereto. A microphone 33 and a speaker 31 are also connected to, and communicate with, the processor 52.

The housing 32 of the portable electronic device 30 houses the processor 52, memory 54, display 38 and key pad 40. The display screen 38 and control panel 40 are accessible at the exterior of the housing. In one embodiment, the portable electronic device 30 is utilized in conjunction with a global positioning system for acquiring signals transmitted from satellites in geosynchronous orbit. In such an embodiment, the processor 52 includes means for calculating, by triangulation, the position of the portable electronic device 30. In such an embodiment, an image file indicative of a selected map is held in memory 54. In accordance with one embodiment, the image file held in memory 54 comprises spatial data indices according to a data structure defining a geographic area of interest.

An operator of the portable electronic device 30 controls the processor 52 through use of control panel 40 to display map images on the display screen 38. Utilizing the control panel 40, the operator selects various zoom levels, corresponding to layers of the data structure for a particular geographic region desired to be displayed on the display screen 38. Data indicative of the map to be displayed is accessed from the memory 54 according to the inputs by the user using the control panel 40. When performing a route planning operation, the operator enters a source location and a destination location, such as by entering addresses, geographic coordinates, well-known buildings or sites, and the like. The processor 52 accesses data structures stored in memory 54 to calculate a suggested route.

FIG. 4 illustrates a navigation and routing system 70 formed in accordance with an alternative embodiment of the present invention. The system 70 includes one or more mobile units 72 capable of performing navigation and/or routing functions, a server 74 and an intervening network 76. The mobile units 72 may each include some or all of the structure and/or functionality of the portable electronic device 30. The server 74 may perform a majority of the navigation and route planning operations and transmit results and limited geographic data to the mobile units 72. Alternatively, the server 74 may simply perform minor management operations. The server 74 communicates with the mobile units 72 through communications links 78 and 80 and the network 76 which may constitute the internet, a wireless communications network supported by ground-based towers and/or satellites, and the like. The mobile units 72 may receive data structures, coordinate information, and the like over communications links 78 and 80 from the network 76.

FIG. 5 illustrates an exemplary roadway network 81 formed in accordance with an embodiment of the present invention. Roadway network 81 may be a subset of the cartographic data stored in the cartographic database 14. Roadway network 81 includes multiple types of roads 84–90. The roads 84–90 may be interstate highways, country roads, residential streets, or exit/entry ramps, for example. The roads 84–90 intersect at intersection nodes 91–100. A segment is a portion of a road 84–90 that extends between two nodes 91–100. For example, segment 82 is a portion of road 86 that extends between node 92 and node 94. Segment 83 is a portion of road 88 that extends between node 94 and node 93. Node 92 is adjacent to node 94, and node 94 is adjacent to node 93. Node 92, however, is not adjacent to node 93 because no uninterrupted segment connects nodes 92 and 93. Node adjacencies refer to nodes that are connected directly to one another through a segment without any intervening nodes.

FIG. 7 illustrates a memory map 140 of node blocks 130–138 stored in memory 16 in accordance with an embodiment of the present invention. In FIG. 7, N node blocks are illustrated. The node blocks 130–138 may be stored consecutively in memory 16 or as a linked list at different locations in memory 16. Alternatively, node blocks 130–138 may be stored in multiple memory devices. Each node block 130–138 stores multiple node records and a single node block record, as discussed below in connection within FIG. 8.

FIG. 8 illustrates a node block 150 formed in accordance with an embodiment of the present invention. Portions of the node block 150 are expanded to illustrate the content of a node record 152 and node block record 162. The node block 150 includes a plurality of node records 152–160, each of which corresponds to a particular road intersection in the roadway network. The node block record 162 may be located at a footer, header, an intermediate point within, or entirely separate from, the node records 152–160. The node records 152–160 shown in FIG. 8 are packed in a compact manner with geographically proximal node records 152–160 being stored in contiguous memory locations. Alternatively, if less compact storage is acceptable, the node records 152–160 may be stored as a linked list at separated, non-contiguous memory locations.

The node record 152 includes a series of fields 170–174 and sub-records 176. Field 170 stores an offset to node block record, field 172 stores a relative offset to center 172, field 174 stores attribute information 174 and sub-records 176 store adjacency information. One sub-record 176 containing adjacency information is expanded and illustrated in more detail to include, with respect to each adjacent node, a series of fields 178–188 that store the location of adjacent node records, road location identification, a distance, a scale factor, outgoing bearing, and straight-line bearing. The node block record 162 includes field 192 that stores a geographic center latitude/longitude for the nodes associated with the node block 150. The node block record 162 also includes field 194 that stores road information 194, field 196 that stores routing information 196, and field 198 that stores node block location information. The contents of each node record 152–160 and node block record 162 will be discussed further below.

Figure 6:
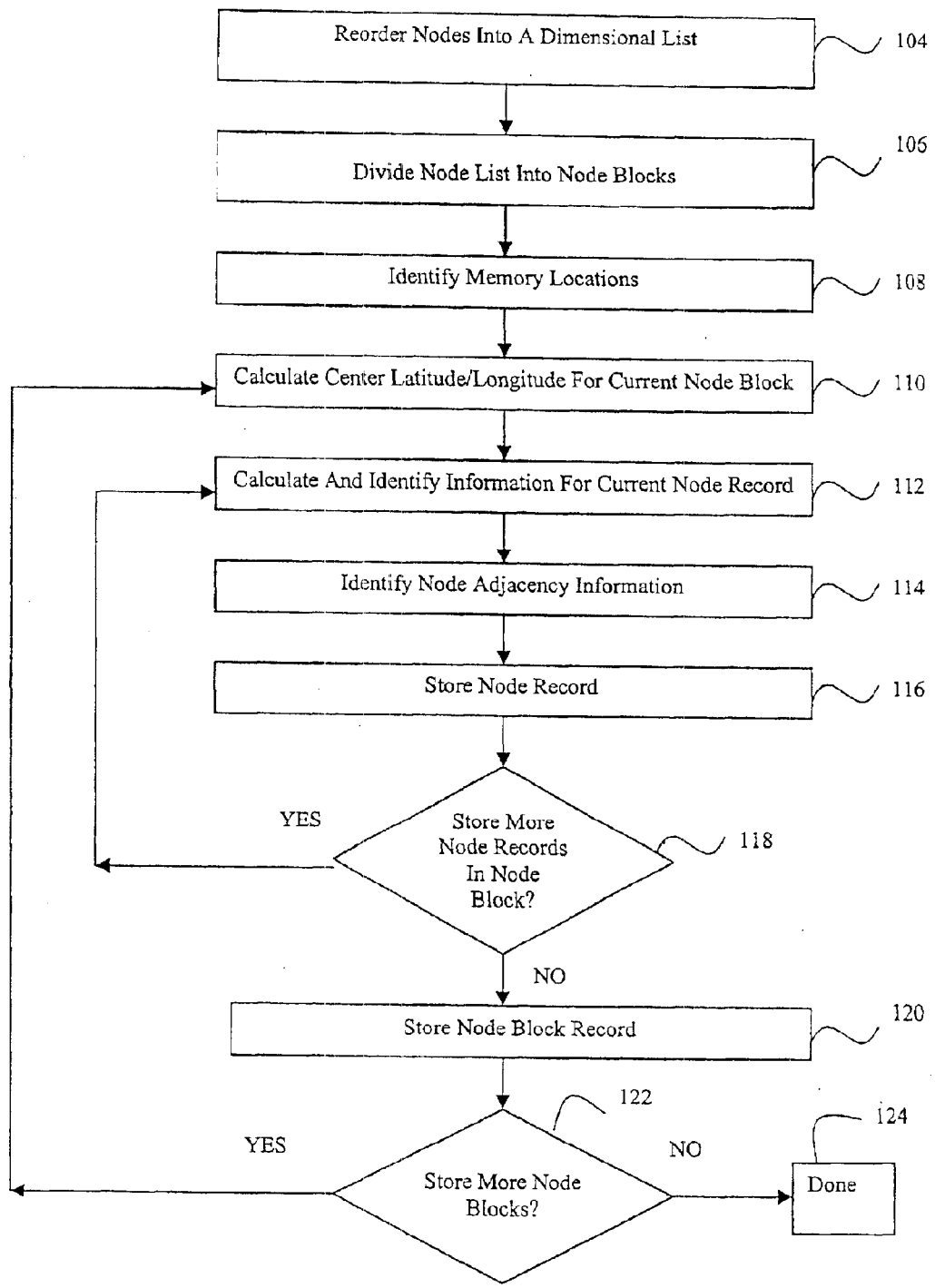
FIG. 6 illustrates a method for storing blocks of node records in accordance with an embodiment of the present invention.

FIG. 6 illustrates a method for storing blocks of node records for cartographic data in accordance with an embodiment of the present invention. Initially, the processor 12 accesses the cartographic database 14. The cartographic database 14 includes a data structure containing the geographic location of each node, for example nodes 91–100 of roadway network 81, and feature data such as the type of road, turn data, speed limit data, road segment lengths, and the like. The nodes 91–100 are distributed in a two dimensional array.

At step 104, the processor 12 reorders the nodes into a one dimensional array of node records. For example, a fractal algorithm such as a Hilbert Space-Filling Curve, may be used to assign a unique number (e.g., one dimension) to each node based on the latitude and longitude information (two dimensions) for each node. The unique numbers provide a key that permits reordering of the node records into a one dimensional node list based on each node's geographic location relative to surrounding nodes. For example, if two nodes are close geographically, the two nodes may be assigned unique numbers that are close together. If the two nodes are not close geographically, or if the area is dense and contains many nodes, such as New York City, the two corresponding unique numbers may be separated in the node list by many other nodes. Optionally, the node list and unique numbers may be assigned based on three dimensional information, such as longitude, latitude and altitude.

At step 106, the processor 12 divides the node list into node blocks by grouping consecutively numbered node records from the list into one node block. As discussed previously, the processor 12 reordered the node records into one list based on geographic proximity criteria. Therefore, each node block will contain node records for physical nodes that are in close geographic proximity to each other. The number of node records selected for each node block is represented by the variable K. K may vary according to the desired storage design, and may not be the same for every node block within a system.

By way of example only, up to 255 node records may be stored in one node block. Optionally, the node block size may be set to equal the size of a block of data transferable from long-term memory to work-space memory. Hence, if the work-space memory is only able to hold up to 512 node records, then each node block may be similarly dimensioned. Alternatively, the node block size may be limited by the number of segments, or roads permitted to be in one node block. For example, the node block may store up to 127 segments. Alternatively, the number of nodes stored in one node block may be determined by the amount of disk space allocated for each node block. Alternatively, the node block size may be limited by geographic size. For example, a node block may be representative of a geographic area that is 50 square miles, or a geographic area that is 50 square city blocks. After every node has been assigned to a node block, the processor 12 determines the total number of node blocks N that will be stored in memory 16.

At step 108, the processor 12 identifies and configures sections of contiguous memory having a size large enough to store each node block of node records in memory 16. In order for the processor 12 to calculate a route using the node information stored in node records, the physical location in memory 16 of each node block and the node records therein must be known.

In steps 110–122, the processor 12 iteratively operates upon each node associated with a node block to build a data structure that describes the nodes and segments of a roadway network in a compact data format. At step 110 the processor 12 calculates the center latitude and longitude for the group of geographic nodes stored in a current node block. The center longitude and latitude may represent the geographic center of the roadway network section described by the group of node records stored in the corresponding node block. The center latitude/longitude information may be stored in the node block record 162 and used as a reference point from which relative latitude/longitude offsets may be calculated for each of the node records stored within the node block. For example, in FIG. 8, the center latitude/longitude for all nodes stored in node records 152–160 is stored in node block record 162, while a relative offset between each node and the center latitude/longitude is later stored in field 172.

At step 112, the processor 12 calculates and identifies node information unique to the current node which is then stored in associated fields 170–174 and sub-records 176 of the node record 152. The processor 12 identifies and stores attribute information associated with the node that is useful for route calculations, such as the routing level of the node and/or travel restrictions affecting the node in field 174. The processor 12 also calculates the relative offset of the latitude/longitude of the node from the center latitude/longitude of the node block calculated at step 110. The relative offset is stored in field 172. Storing the latitude/longitude offset information typically uses less memory space than storing the complete actual latitude/longitude data of the node. Additionally, the processor 12 calculates the offset between the physical location in memory of the node record 152–160 and the node block record 162 and stores the relative offset in field 170. The offset to the node block record 162 may be used when the processor 12 accesses the node block record 162.

Next, at step 114, the processor 12 determines node adjacency information for each node. Node adjacency information describes the relation between a current node and the node(s) directly adjacent thereto. The present node is connected to the directly adjacent nodes through road segments having no intervening nodes. The adjacency information is utilized to locate adjacent nodes in physical memory, and to provide adjacency attribute information such as road segment distance, routing level, road class, and the like. It may also provide an estimation of the position of the adjacent node.

At step 114, the processor 12 first identifies the adjacent nodes and associated outgoing road segments connecting the current node to the adjacent nodes. The processor 12 then determines, for each adjacent node, an outgoing bearing direction from the current node along the outgoing road segment and the distance measured along the outgoing road segment to the adjacent node. The outgoing bearing direction is stored in field 186 and the distance is stored in field 182. The processor 12 also identifies the road type or class. The road type or class may be stored in the node block record 162, or alternatively in field 176. When the road types or classes are stored in the node block record 162 they may be stored as a table. The processor 12 (at step 114) merely identifies the type or class of the road segment to an adjacent node and stores an index field 180 in the sub-record 176. The index points to an entry in the corresponding table stored in the node block record 162, and enables the processor 12 to locate in memory 16 the information pertaining to the road that the adjacency follows. The processor 12 also stores, in field 180, a pointer to the actual location in memory map 140 where the detailed information regarding the adjacent node is stored. Storing the outgoing bearing along the road enables route guidance to determine an appropriate turn angle at each adjacency.

During the execution of the route calculation algorithm, the adjacencies at a given node are explored. One piece of desired information may be an estimate of the location of the adjacent nodes. If the road segment to the adjacent node is substantially straight, previously identified distance and bearing can be used to estimate the position. If this is not the case, the processor 12 may also store a straight-line bearing to the adjacent node in field 188, and a scale factor in field 184. The scale factor may then be applied to the road distance to determine an estimate of the straight-line distance to the adjacent node. The straight-line bearing represents a direction or angle of a line connecting the current node and the adjacent node. The scale factor is a percentage of the road segment distance that represents the straight-line distance.

For example, for node 94 of FIG. 5, nodes 92, 93, and 97 are adjacent nodes. The bearing direction from node 94 to node 92 is straight along road 86 (i.e. west) and the distance from node 94 to 92 along segment 82 may be calculated. In this example, the outgoing bearing and distance provide sufficient information for the routing algorithm to determine the relative position of the adjacent node. Therefore, no further adjacency information is needed. For nodes 91 and 93, however, the road 85 curves between node 91 and adjacent node 93. The outgoing bearing along road 85 is denoted by line A; the straight-line bearing is denoted by line B. The outgoing bearing and the distance are used to calculate a location. If the calculated location is not within a predetermined distance of the actual location of the adjacent node, the processor 12 may store the straight-line bearing B from node 91 to node 93 and a distance scale factor. The straight-line bearing B and the scale factor, together with the distance, may then be used to estimate the location of the adjacent node.

At step 116, the processor 12 stores information identified at steps 112 and 114 in a node record 152–160. Returning to FIG. 8, the processor 12 stores the offset to the node block record 162 in field 170, the relative offset to the node block's center latitude/longitude in field 172, and attribute information about the node that is useful when calculating a route in field 174, as previously discussed. The processor 12 also stores node adjacency information as a list of adjacency sub-records 176. There may be one or more adjacency sub-records 176. As illustrated by the expanded adjacency sub-record 176, the adjacency information may include field 178 that contains the physical location in memory (e.g., a pointer or offset) of the adjacent nodes, field 180 that includes road location identification to locate data for the road the adjacent node follows, field 182 that stores the distance to the adjacent node, field 184 that stores the scale factor, field 186 that stores the outgoing bearing, and field 188 that stores the straight-line bearing. As previously discussed, the scale factor 184 and straight-line bearing 188 may or may not be stored.

Storing the adjacency information at each node that is utilized to calculate or estimate the position of each adjacent node is advantageous during the route calculation process. Therefore, during the node expansion step, the processor 12 does not need to reference information stored with each adjacent node, and thus reduces cache flush and memory transfer cycles. Also, storage space is typically saved by storing data used to estimate a node's position rather than an actual position value.

At step 118, the processor 12 determines whether there are more node records to be stored in the node block. For example, the system determines whether K node records have been stored in node block 150. If less than K node records have been stored, the flow returns to step 112.

The processor 12 continues to loop between steps 112 and 118 until K node records have been stored in the node block. The processor 12 then stores the node block record 162 at step 120. The node block record 162 includes information used by the node records 152–160 and by other node blocks.

The node block record 162 stores the center latitude/longitude in field 192 calculated in step 110 for the node block, as illustrated by the expanded node block record 162 in FIG. 8. The node block record 162 also stores other routing information in field 196, such as driving restrictions and the like. Additionally, the node block record 162 stores node block location information in field 198 and road information in field 194 applicable to one or more node records 152–160 in node block 150. For example, FIG. 5 includes roads 84–90 and nodes 91–100. If nodes 91–100 are individually stored in node records 152–160, the road information in field 194 will include information about roads 84–90 such as the type of roads (i.e. highway, residential, and the like), routing levels, speed information, and whether the roads are one-way roads. Instead of storing information relative to road 86 in each of nodes 91 and 92, information for road 86 is stored once in the node block record 162 and node records for nodes 91 and 92 store indexes into the node block record 162. The indices require less storage space, and allow adjacencies within the node block that share common roads to use the same data.

Next, at step 122, the processor 12 determines whether there are more node blocks to be stored. For example, the processor 12 determines whether N node blocks have been stored in memory 16. If there are more node blocks to be stored, flow returns to step 10 where the latitude/longitude for the next node block identified in step 106 is calculated. If N node blocks have been stored, flow passes to step 124 and the method is complete.

Figure 9:
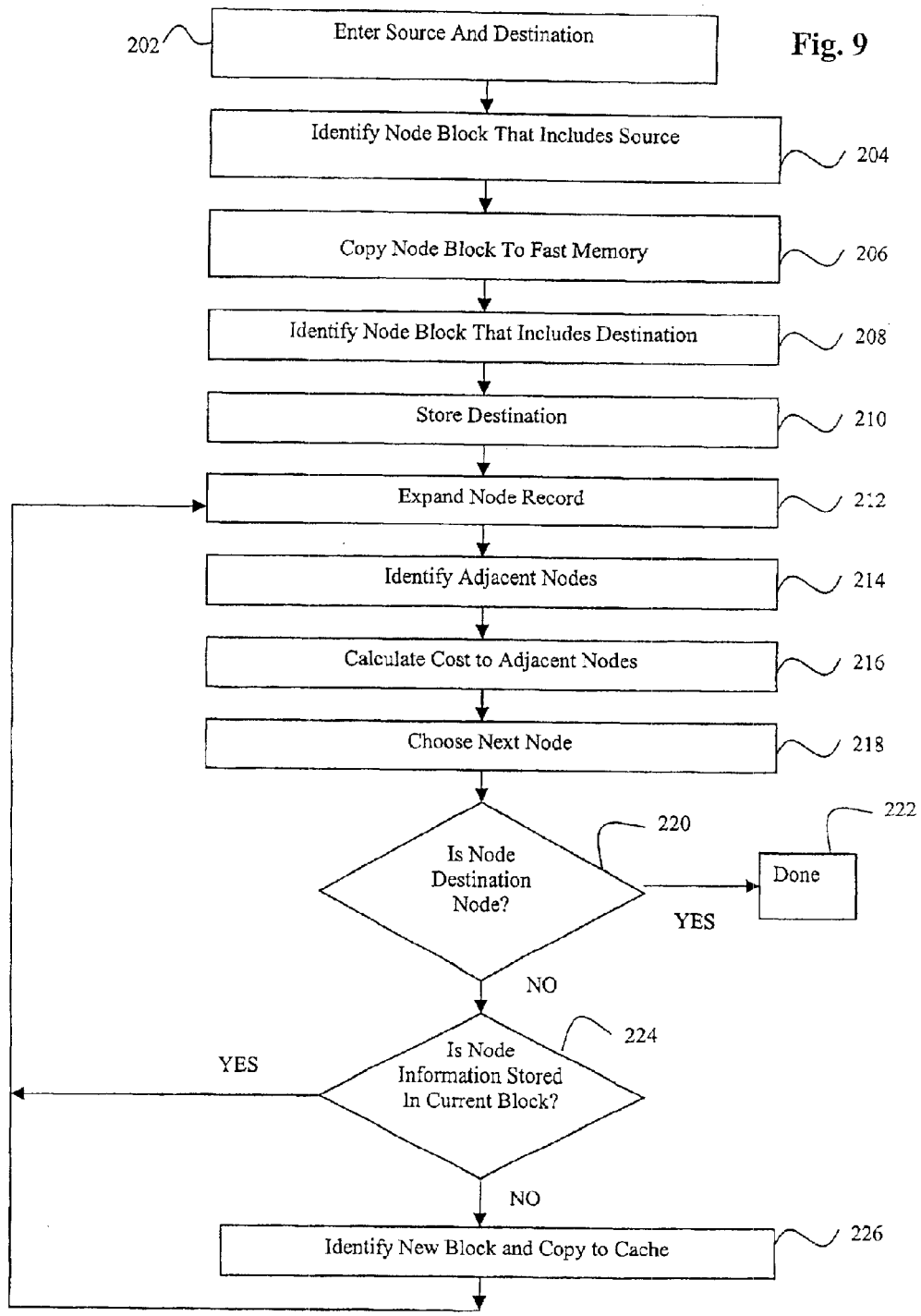
FIG. 9 illustrates a method for planning a potential path in accordance with an embodiment of the present invention.

FIG. 9 illustrates a method for planning a potential path in accordance with an embodiment of the present invention. The method illustrated in FIG. 9 is a heuristic algorithm that calculates a path in one direction. It should be understood, however, that other planning algorithms exist, such as shortest path, and any planning algorithm may be utilized to compute a path using the stored blocks of cartographic data discussed previously. For example, using a heuristic algorithm to calculate a route bi-directionally may be advantageous because it can compute a route in less time.

Additionally, the method may be utilized to iteratively examine adjacent nodes emanating from the source and destination in the network, eventually "discovering" a low-cost path.

At step 202, an operator of the portable electronic device 30 enters a source and a destination through use of the control panel 40. Although portable electronic device 30 is used in relation to FIG. 9, any route planning device may be used.

At step 204, the processor 52 accesses the memory 54 and identifies the node block that includes the node record corresponding to the source location. The source location may be identified by road information such as an address, in the node block record, or by converting the address to latitude/longitude coordinates and accessing the center latitude/longitude information stored in the node block record. The node record corresponding to the source location is placed on an open list. The open list includes nodes that have been referenced but not yet expanded.

Once the node block that includes the source location has been identified, the processor 52 copies the node block from a long-term or slow memory storage device such as memory 54 (i.e. a hard drive) into a work space or fast memory at step 206. The fast memory may be cache memory, such as RAM, which is utilized to store data for a short time. The time required to access data in memory 54 is typically greater than the time required to access data in a cache. During route planning, node blocks are moved to the fast memory on an as needed basis. Once a node block is loaded in fast memory, it may be accessed many times successively by the processor 52 while planning the route. Additionally, because nodes are organized into node blocks according to geographic location, there is a high likelihood that adjacent nodes will be located within the same node block. Thus, a single node block may be accessed several times before a new node block is to be loaded and the old node block is to be flushed from fast memory.

At step 208, the processor 52 accesses the memory 54 and identifies the node block that includes the destination location. The destination location may be identified in the same manner as the source location in step 204. Next, at step 210, the processor 52 stores the destination location for later use in drawing the source to the destination.

At step 212, the processor 52 expands, or dereferences, the node record stored in RAM that has the current least cost. By expanding the node record, the processor 52 is able to utilize information stored in the node record. Additionally, the processor 52 moves the node record from the open list (e.g., a list of nodes to be explored) to a closed list (e.g., a list of previously explored node-to-node segments). The closed list includes nodes that have been expanded, and is utilized to retain a running list of segments and nodes that have already been considered and remain viable as potential paths. Additionally, the path with the least cost from each node on the closed list to the source node is known.

At step 214, the processor 52 identifies the nodes that are adjacent to the current node by accessing the adjacency information in field 176 for the node record 152 of the source node. Because nodes records have been ordered in node blocks 130–138 based upon geographic proximity, there is a high likelihood that geographically adjacent nodes will be stored in the same node block. Hence, the nodes adjacent to the source node are likely to be stored in the node block containing the current node record. If so stored, a new node block need not be loaded to expand or de-reference the nodes adjacent to the current node.

At step 216, the processor 52 calculates a current cost to each adjacent node via the node being expanded. If the adjacent node is not yet in the open list or closed list, it is moved to the open list, and if it is already present in the open list, its current cost is updated. A number of factors may be considered by the processor 52 when determining cost, and cost may be impacted by data entered by the user. The user may request the shortest distance or fastest route, or a route that includes no highways, for example.

In previous systems the latitude/longitude data for each node was stored with the node record. Thus, every adjacent node needed to be expanded in order to determine whether the adjacent node should be considered for the route. By using data stored in the method of FIG. 6, however, the processor 52 may estimate the position of the adjacent nodes by utilizing the outgoing bearing in field 186, distance in field 182, and/or straight-line bearing in field 188 and scale factor in field 184. The processor 52 may compare the location of the destination stored in step 210 to the estimated position for each adjacent node.

The processor 52 may also consider such factors as travel speed, routing level of the road, and turn restriction data. The processor 52 may access information associated with the road traversed to the adjacent node from the node block record 162, such as the road information in field 194. If necessary, node block records 162 from other node blocks may be read into cache memory. However, it is likely that the adjacent nodes may be stored in the same node block as the current node, as the nodes have been stored based upon geographic locality. If the road to the first adjacent node is a neighborhood street and the road to the second adjacent node is a highway, the processor 52 may assign a higher cost to the first adjacent node based on routing level. As discussed previously, the processor 52 may place a greater emphasis on calculating a potential path that is the shortest distance or a path that requires the least amount of travel time based upon input from the operator. Therefore, it is possible that the node with the bearing 186 closest to the straight-line bearing, or the node that allows higher travel speeds may not be determined to be the least cost node.

At step 218, the processor 52 chooses the next node. The next node chosen is the lowest cost node based upon the factors considered above.

At step 220, the processor 52 determines whether the next node is the destination node. If the next node is not the destination node, flow passes to step 224. If the next node is the destination node, flow passes to step 222 and the path is complete.

Next, at step 224, the processor 52 reads the location of the adjacent node record in field 178 to determine whether the node record of the next node identified in step 218 is stored in the node block currently in cache memory. If the node block is not in the cache memory, flow passes to step 226. If the node block is in cache memory, flow returns to step 212 where the node record is expanded.

At step 226, the processor 52 determines the node block location from the node location information in field 198. The processor 52 locates the new node block in memory 54 and copies the node block into cache memory. When the new node block is copied into cache memory, the previous node block may be "flushed" from the cache. Flow then returns to step 212.

As illustrated by the method of FIG. 9, cartographic data stored utilizing the method of FIG. 6 may be more quickly accessed and utilized to calculate a route than data stored using previous methods. By storing data based on geographic proximity, a number of nodes that are likely to be accessed are read into cache memory at one time, eliminating the need for the processor 12 to read data for each possible node individually from memory 54 and resulting in a route planned in less time. Additionally, by storing position estimation information such as bearing and distance, offset data rather than full coordinate data, and by storing road information common to multiple nodes only once within a node block, the amount of memory space required is significantly reduced.

While the invention has been described with reference to at least one embodiment, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for organizing roadway network data in a memory storage device, comprising:
   providing a data set indicative of a roadway network;
   identifying proximity criteria for intersections between roads in said roadway network, wherein each of said intersections is indicative of a node;
   grouping said nodes into a node block based on said proximity criteria using a Hilbert space filling curve; and
   storing node records containing data indicative of said nodes, said node records being stored as a group in said node block in contiguous memory.

2. A method for calculating a navigation route between first and second geographic locations, comprising:
   providing a data set comprised of node blocks of data, said data indicative of a roadway network of roads intersecting at intersection nodes, wherein said data includes proximity criteria indicative of said intersection nodes;
   accessing a first node record including data indicative of a single first node at a first geographic location, said first node record included in a first node block, said first node record containing adjacency information indicative of an estimated location of only adjacent nodes directly connected to said first node;
   calculating a bearing direction from said first geographic location towards a second geographic location based on said adjacency information included in said first node record;
   accessing one of a header or footer included in said first node block, said header or footer including common feature data indicative of traffic characteristics for said roads; and
   accessing a second node record included in said first node block, said second node record including data indicative of a navigation route, said navigation route contiguous from said first node record.

3. The method of claim 2, wherein said first and second node records are stored contiguously in a memory storage device.

4. The method of claim 2, wherein said proximity criteria includes at least one of a latitude coordinate and a longitude coordinate for each of said node block.

5. The method of claim 2, wherein the calculating step further comprises:
   identifying at least one adjacent node from a list of adjacent nodes, said list stored in said first node record;
   identifying at least one of a bearing component and a distance component for each said adjacent node; and
   choosing a next node from said adjacent nodes based on at least one of said proximity criteria and said common feature data.

6. The method of claim 2, further comprising choosing a next node based on at least one of a bearing component and a scale factor.

7. The method of claim 2, wherein said common feature data further comprises data indicative of at least road level and speed data.

8. The method of claim 2, further comprising calculating a cost from said first geographic location to a next node, said cost based on said common feature data.

9. The method of claim 2, wherein each said node block includes up to 255 intersection nodes.

10. The method of claim 2, wherein each said node block further comprising a group of node records based on said proximity criteria.

11. A data structure embodied on a computer readable medium for defining a roadway network having road segments intersecting at nodes, the data structure comprising:
   node records containing data indicative of corresponding nodes in a roadway network, a first node record corresponding to a single first node and containing adjacency information indicative of an estimated location of only adjacent nodes directly connected to said first node, said estimated location being determined with respect to said first node, wherein said node records further comprise fields storing bearing data indicative of directions in which corresponding road segments extend from said corresponding nodes.

12. The data structure of claim 11, wherein said node records further comprise a list of sub-records, each of said sub-records containing data indicative of said estimated location for a corresponding one of said adjacent nodes.

13. The data structure of claim 11, wherein said node records further comprise fields storing distance data indicative of distances between adjacent nodes.

14. The data structure of claim 11, wherein said node records further comprise fields storing data indicative of outgoing and straight-line bearings between two nodes, said outgoing bearing representing a direction of travel from one of said two nodes over a road segment to another of said two nodes, said straight-line bearing representing a direction of a straight line connecting said two nodes.

15. The data structure of claim 11, further comprising a table containing data indicative of features describing road segments in a roadway network, each of said node records containing a field storing an index into said table, said index identifying a corresponding one of said features describing a road segment intersecting a corresponding node.

16. The data structure of claim 11, further comprising a node block record associated with a group of nodes that are geographically proximate one another, said node block record containing data indicative of geographic coordinates for a center of said group of nodes.

17. The data structure of claim 11, wherein said node records further comprising fields containing data indicative of a relative offset between geographic coordinates of each node and a predefined geographic reference point within the roadway network.

18. The data structure of claim 11, wherein said node records are ordered on the computer readable medium based on a geographic location of each node relative to geographic locations of surrounding nodes such that node records of geographically proximate nodes are stored near one another on the computer readable medium.

19. A navigation system comprising:
   a first memory storing data sets indicative of roadway networks, said data sets stored in blocks of data wherein said blocks of data include geographical data indicative of nodes, said geographical data being stored as node records, each node record corresponding to a single node and containing adjacency information indicative of an estimated location of only adjacent nodes directly connected to said corresponding node, wherein said blocks of data include a plurality of said nodes in an equal plurality of said node records, said node records including a distance component and at least one bearing component associated with at least one adjacent node;
   a second memory storing at least one said blocks of data temporarily;
   a route calculation module calculating a planned route over the roadway network between source and destination locations based on the data stored in the second memory; and
   a display displaying said route calculated by said route calculation module.

20. The navigation system of claim 19, wherein said blocks of data include at least one of a block header and block footer comprising characteristic information describing at least one road segment feature descriptive of roadway segments leading to at least two nodes in said blocks of data.

21. The navigation system of claim 19, wherein said blocks of data include a plurality of said nodes in an equal plurality of said node records, said plurality of said node records stored in adjacent memory locations.

22. The navigation system of claim 19, wherein said blocks of data include a table associated with a plurality of node records stored in said blocks of data, said table containing a list of features descriptive of road segments interconnecting said nodes, at least one node record containing an index into said table identifying a feature representative of a node associated with at least one node record.

23. The navigation system of claim 19, wherein said blocks of data include a single latitude and a single longitude coordinate based on said geographical data indicative of said nodes.

24. The navigation system of claim 19, wherein said node records are ordered on said first memory based on a geographic location of each node relative to geographic locations of surrounding nodes such that node records of geographically proximate nodes are stored near one another on said first memory.

25. A method for organizing roadway network data in a memory storage device, comprising:
   providing a data set indicative of a roadway network containing roads and intersections between roads, said intersections representing nodes distributed in a multi-dimension array, said data set including node records uniquely associated with corresponding nodes;
   assigning a unique number from a one-dimension array to each said node record based on a geographic location of a corresponding node relative to geographic locations of surrounding nodes such that geographically close nodes are assigned close unique numbers from the one-dimension array;
   reordering said node records into a node list based on said unique numbers;
   dividing said node list into at least first and second node blocks by grouping consecutively numbered node records proximate one another in said first and second node blocks; and
   storing node records in said first node block in contiguous memory.

26. The method of claim 25, wherein said reordering step reorders said nodes into a one dimensional array of nodes based on said unique numbers.

27. The method of claim 25, wherein said storing step includes storing data indicative of a plurality of said nodes in an equal plurality of said node records, and storing said plurality of said node records in adjacent memory locations.

28. The method of claim 25, wherein said storing step stores said first node block in a long-term memory as a contiguous memory section having a length configured to be loaded into a work-space memory as a single, unitary block of node records.

29. The method of claim 25, further comprising storing with said first node block at least one of a block header and block footer comprising characteristic information describing at least one road segment feature descriptive of roadway segments leading to at least two nodes in said first node block.

30. The method of claim 25, further comprising storing a table associated with said node records grouped in said first node block, said table containing a list of features descriptive of road segments interconnecting said nodes, at least one node record containing an index into said table identifying a feature representative of a node associated with said at least one node record.

31. The method of claim 25, wherein said proximity criteria comprises at least one of a latitude coordinate and a longitude coordinate for each of said intersections.

32. The method of claim 25, further comprising:
   for a first node in said data set, identifying an adjacent node and a road segment connecting said first node and said adjacent node;
   identifying for said adjacent node a bearing component and a distance component representative of a direction of travel along, and length of, said road segment; and
   storing said bearing and distance components in a node record associated with said first node.

33. The method of claim 25, further comprising:
   identifying an outgoing bearing and a straight-line bearing between two nodes in said data set, said two nodes being connected by a road segment and by a straight line, said outgoing bearing representing a direction at which said road segment extends from one of said two nodes, said straight-line bearing representing a direction at which said straight line extends from said one of said two nodes.

34. The method of claim 25, further comprising:

identifying adjacency information for nodes directly connected to a first node and storing adjacency information for each of said nodes in a list of sub-records.

35. The method of claim 25, further comprising:

identifying a geographic center of said nodes grouped in said node block and storing said geographic center with said first node block.

36. The method of claim 25, further comprising:

identifying a relative offset between a geographic location of a first node in said first node block and a geographic center associated with said first node block, and storing said relative offset in a node record associated with said first node.

37. The method of claim 25, further comprising:

storing a table of features descriptive of road segments interconnecting nodes grouped in said first node block, and storing in each node record an offset to a location in memory at which said table is stored.

* * * * *